United States Patent [19]

Matsuura et al.

[11] Patent Number: 6,139,899
[45] Date of Patent: Oct. 31, 2000

[54] SOYBEAN MILK

[75] Inventors: Masaru Matsuura; Jun Sasaki, both of Chiba Pref., Japan

[73] Assignee: Kikkoman Corporation, Noda, Japan

[21] Appl. No.: 09/255,694

[22] Filed: Feb. 23, 1999

[30] Foreign Application Priority Data

Mar. 3, 1998 [JP] Japan ................................. 10-066012

[51] Int. Cl.$^7$ .............................. A23L 1/20; A23L 2/38; A23L 1/00

[52] U.S. Cl. .......................... 426/634; 426/598; 426/507; 426/508

[58] Field of Search ..................... 426/634, 598, 426/507, 508

[56] References Cited

U.S. PATENT DOCUMENTS 5,789,581  8/1998  Matsuura et al. .

*Primary Examiner*—Anthony Weier
*Attorney, Agent, or Firm*—Young & Thompson

[57] ABSTRACT

Soybean milk contains malonylisoflavone glycosides in a ratio of 70% or higher to the total isoflavone compounds in the soybean milk.

5 Claims, No Drawings

SOYBEAN MILK

BACKGROUND OF THE INVENTION

1. Field of the Invention

The present invention relates to novel soybean milk containing malonylisoflavone glycosides in a ratio of 70% or higher to the total isoflavone compounds in the soybean milk.

2. Description of Related Art

The quality, particularly the flavor of soybean milk obtained by grinding soybeans and removing solid matter from the slurry has great influences on the quality of soybean milk-related products prepared therefrom, such as tofu (soybean curd), beverages and desserts.

The flavor that is the most problematical for soybean milk-related products is the beany flavor. Such miscellaneous tastes as acridness and astringency are also of concern.

Influences on these unfavorable flavors or tastes being attributed to the enzyme system of soybeans, various methods for preparing soybean milk under conditions which inhibit the enzymes have been studied.

It has turned out that soybeans, a raw material of soybean milk, contain isoflavone compounds, i.e., daidzin, glycitin, genistin, acetyldaidzin, and acetylgenistin, and their agricons, i.e., daizein, glycitein, and genistein. In recent years, existence of malonylisoflavone glycosides such as malonyldaidzin and malonylgenistin in soybeans has been confirmed, and these malonylisoflavone glycosides have turned out to constitute the main proportion of soybean isoflavone compounds.

SUMMARY OF THE INVENTION

An object of the present invention is to provide soybean milk having a satisfactory flavor and soybean milk-related products prepared therefrom.

The inventors of the present invention have investigated into the relationship between the flavor of soybean milk and the isoflavone compounds. They have found as a result that malonyl compounds decrease with increases in isoflavone glycosides and their aglycones during the preparation of soybean milk and that the increased isoflavone glycosides and aglycones have adverse influences on the flavor of soybean milk, giving unpleasant miscellaneous tastes.

As a result of further studies, the inventors have reached the finding that soybean milk with a satisfactory flavor can be obtained by controlling the ratio of malonylisoflavone glycosides in the soybean milk in the course of preparation. The present invention has been completed based on this finding.

The present invention is the first to take the ratio of an isoflavone compounds content as an index of flavor of soybean milk.

The present invention relates to novel soybean milk containing malonylisoflavone glycosides in a ratio of 70% or higher to the total isoflavone compounds in the soybean milk. It also relates to a soybean milk-related product prepared from the novel soybean milk.

The novel soybean milk according to the present invention has a satisfactory flavor free from a beany flavor or unpleasant miscellaneous tastes.

DETAILED DESCRIPTION OF THE INVENTION

Soybeans which can be used as a raw material of the novel soybean milk of the invention are not at all different from those generally used in the soybean food industry.

Soybeans, either as such or skinned or soaked in cold water at 15° C. or lower, preferably 10° C. or lower, are ground with water to a slurry.

Where soybeans are soaked in water, the esterase and glycosidase of soybeans are activated to convert malonylisoflavone glycosides to isoflavone glycosides and convert isoflavone glycosides to aglycones. Accordingly, the actions of these enzymes in the processing can be controlled by choosing non-soaking or low-temperature soaking.

For the same reason, soybeans should be ground at low temperatures not higher than 15° C., preferably 10° C. or lower, so as to minimize the enzymatic actions. Taking the heat generated during grinding into consideration, grinding is carried out in an ordinary grinder using 3 to 15 times as much water of 15° C. or lower as unsoaked soybeans or 4 to 10 times as much water of 15° C. or lower as soaked soybeans.

It is necessary to heat the resulting slurry at 70° C. or higher to inhibit the actions of various enzymes of soybeans and to deactivate the enzymes rapidly. More specifically, the slurry is transferred to a solid-liquid separation step through a double-walled pipe while heated indirectly to 70° C. or higher by warm or hot water, etc. circulated through the outer pipe and is then passed through a transfer pipe where steam is blown to directly heat the slurry to 80 to 120° C.

The slurry heated to 80 to 120° C. is kept at that temperature for 0.05 to 5 minutes and then cooled continuously by indirect cooling to about 60 to 85° C., followed by solid-liquid separation by means of a solid-liquid separator, such as a screw decanter, a drum squeezer, a screw type filter, and so on.

The soybean milk as obtained above can serve, either as such or after deaeration in a vacuum chamber, as a starting material for soybean milk-related products. The soybean milk may be cooled to 15° C. or lower to be supplied as chilled soybean milk. If desired, the soybean milk can be sterilized by heating in a sterilizer at 120 to 155° C. for 1 to 240 seconds.

The soybean milk thus prepared contains 70% or more of malonylisoflavone glycosides based on the total isoflavone compounds of the soybean milk and is pleasant to the palate with little miscellaneous tastes. Therefore, soybean milk-related products prepared therefrom, such as beverages, yogurt, cheese, tofu, ice cream, and the like, are also satisfactory in palatability as well.

The total content of isoflavone compounds in the soybean milk is usually from 2,000 to 7,000 $\mu$g per gram of freeze-dried soybean milk.

The present invention will now be illustrated in greater detail with reference to Examples.

EXAMPLE 1

Commercially available soybeans (IOM, produced in U.S.A.) were washed with tap water and soaked in 5 times as much tap water as the soybeans at 10° C. for 20 hours to swell. The swollen soybeans were ground while adding water of 5° C. While kept in low temperature, the resulting slurry was introduced into a double-walled heater, where it was heated up to 80° C. over a 90 second period, and steam was then blown therethrough to heat the slurry to 105° C., at which the slurry was maintained for 10 seconds. After cooling to 85° C., the slurry was separated by means of a screw decanter into soybean milk and refuse. After deaeration, the soybean milk was cooled to 10° C. to give chilled soybean milk. For comparison, chilled soybean milk was prepared in the same manner as described above, except for using water of 25° C. for soaking.

The content of isoflavone compounds in the resulting soybean milk was measured as follows. The results obtained are shown in Table 1 below.

Method of Measuring Isoflavone Compounds Content:

Two grams of freeze-dried soybean milk were extracted with a mixed solvent of 100 ml of acetonitrile and 20 ml of a 0.1N hydrochloric acid solution at room temperature for 2 hours while stirring. The extract was filtered through filter paper, and the filtrate was concentrated to dryness under reduced pressure. The solid was re-dissolved in 10 ml of a 80% methanol solution and filtered through a membrane filter having a pore size of 0.22 $\mu$m to prepare a sample for analysis. Isoflavone compounds of the sample were analyzed by high-performance liquid chromatography (HPLC) on Model 490D to which Model 680 and Model 510, all manufactured by Waters, Inc., U.S.A., were connected. As a column, CAPCELL PAK C18 (4.6 mm×150 mm), manufactured by Shiseido Co., Ltd., was used.

The sample (20 $\mu$l) was passed through the column at a flow rate of 1 ml/min, and the column was eluted with a 0.1% acetic acid-added acetonitrile solution with an acetonitrile concentration gradient from 15 to 40% by weight. Each fraction obtained was analyzed from its absorbance at 254 nm. The isoflavone compounds were determined from the peak areas.

TABLE 1

Isoflavone Compounds Content in
Soybean Milk ($\mu$g/g-freeze-dried soybean milk)

|  | Invention | Comparison |
|---|---|---|
| Malonyldaidzin | 1318 | 1128 |
| Malonylgenistin | 1512 | 1297 |
| Malonylglycitin | 375 | 283 |
| Sub-total | 3205 | 2708 |
|  | (71.8%) | (60.3%) |
| Acetyldaidzin | 0 | 1 |
| Acetylgenistin | 2 | 3 |
| Acetylglycitin | 0 | 0 |
| Daidzin | 431 | 610 |
| Genistin | 479 | 638 |
| Glycitin | 216 | 325 |
| Daidzein | 65 | 97 |
| Genistein | 63 | 107 |
| Glycitein | 0 | 0 |
| Sub-total | 1256 | 1781 |
|  | (28.2%) | (39.7%) |
| Total | 4461 | 4489 |
|  | (100.0%) | (100.0%) |

The soybean milk prepared was subjected to an organoleptic test (two sample difference test) by 15 panel members. The results obtained are shown in Table 2 below. The numbers in Table 2 are the numbers of panel members.

TABLE 2

Organoleptic Test on Soybean Milk Beverage

|  | Less beany flavor | Less miscellaneous tastes | Pleasant aftertaste |
|---|---|---|---|
| Invention | 12 | 14 | 15 |
| Comparison | 3 | 1 | 0 |

EXAMPLE 2

Commercially available soybeans (IOM, produced in U.S.A.) were washed with water of 5° C. and ground while adding 4.5 times as much water as the soybeans at 5° C. The resulting slurry was continuously heated up to 65° C. by indirect heating and then to 105° C. by blowing steam, at which the slurry was maintained for 30 seconds. After cooling to 85° C., the slurry was separated into soybean milk and refuse by means of a screw decanter. After deaeration, the soybean milk was cooled to 10° C. to give chilled soybean milk. For comparison, chilled soybean milk was prepared in the same manner as described above, except for using water of 25° C. for grinding.

The results of analysis on isoflavone compounds in the soybean milk are shown in Table 3 below.

TABLE 3

Isoflavone Compounds Content in
Soybean Milk ($\mu$g/g-freeze-dried soybean milk)

|  | Invention | Comparison |
|---|---|---|
| Malonyldaidzin | 1338 | 1205 |
| Malonylgenistin | 1640 | 1352 |
| Malonylglycitin | 379 | 281 |
| Sub-total | 3357 | 2838 |
|  | (76.0%) | (64.1%) |
| Acetyldaidzin | 0 | 1 |
| Acetylgenistin | 1 | 2 |
| Acetylglycitin | 0 | 0 |
| Daidzin | 374 | 413 |
| Genistin | 416 | 592 |
| Glycitin | 213 | 293 |
| Daidzein | 28 | 125 |
| Genistein | 30 | 148 |
| Glycitein | 0 | 14 |
| Sub-total | 1062 | 1588 |
|  | (24.0%) | (35.9%) |
| Total | 4419 | 4426 |
|  | (100.0%) | (100.0%) |

The protein concentration of the above prepared soybean milk was adjusted to 6.0%, and magnesium chloride and calcium chloride were added thereto as coagulants in concentrations of 0.30% and 0.05%, respectively. The mixture was packed into a plastic container and heated at 80° C. for 40 minutes to produce packed tofu.

The packed tofu was freeze-dried and analyzed in the same manner as described above to determine the isoflavone compounds. The analytical results obtained are shown in Table 4 below.

TABLE 4

Isoflavone Compounds Content in Tofu ($\mu$g/g-freeze-dried tofu)

|  | Invention | Comparison |
|---|---|---|
| Malonyldaidzin | 1261 | 1148 |
| Malonylgenistin | 1584 | 1275 |
| Malonylglycitin | 366 | 267 |
| Sub-total | 3211 | 2690 |
|  | (71.9%) | (60.4%) |
| Acetyldaidzin | 0 | 1 |
| Acetylgenistin | 1 | 2 |
| Acetylglycitin | 0 | 0 |
| Daidzin | 410 | 522 |
| Genistin | 486 | 615 |
| Glycitin | 284 | 323 |
| Daidzein | 39 | 136 |
| Genistein | 32 | 153 |
| Glycitein | 0 | 14 |
| Sub-total | 1252 | 1763 |
|  | (28.1%) | (39.6%) |
| Total | 4463 | 4453 |
|  | (100.0%) | (100.0%) |

The packed tofu prepared was subjected to an organoleptic test (two sample difference test) by 15 panel members.

The results obtained are shown in Table 5 below. The numbers in Table 5 are the numbers of panel members.

TABLE 5

Organoleptic Test on Packed Tofu

|  | Less rancid odor | Less miscellaneous tastes | tasty |
|---|---|---|---|
| Invention | 14 | 15 | 15 |
| Comparison | 1 | 0 | 0 |

What is claimed is:

1. Soybean milk containing isoflavone compounds including malonylisoflavone glycosides, wherein the ratio of malonylisoflavone glycosides to total isoflavone compounds is greater than or equal to 70% in the soybean milk.

2. Soybean milk according to claim 1, wherein the soybean milk contains a total content of isoflavone compounds ranging from 2,000 to 7,000 µg per gram of freeze-dried soybean milk.

3. Soybean milk according to claim 1, which is obtained by grinding unsoaked soybeans or soaked soybeans at a temperature not exceeding 15° C. into a slurry, immediately heating the slurry, cooling the slurry, and separating the slurry into a solid fraction and a liquid fraction.

4. A soybean milk-related product prepared from the soybean milk of claim 1.

5. A soybean milk-related product according to claim 4, wherein said product is soybean milk beverages, tofu, soybean milk yogurt, soybean milk cheese, or soybean milk ice cream.

* * * * *